United States Patent
Lee et al.

(10) Patent No.: US 11,610,133 B2
(45) Date of Patent: Mar. 21, 2023

(54) METHOD AND APPARATUS FOR PRODUCING INFRARED SPECTRUM

(71) Applicant: AGENCY FOR DEFENSE DEVELOPMENT, Daejeon (KR)

(72) Inventors: Chang Sik Lee, Daejeon (KR); Jong Seon Kim, Daejeon (KR); Hyeon Jeong Kim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 225 days.

(21) Appl. No.: 17/124,323

(22) Filed: Dec. 16, 2020

(65) Prior Publication Data

US 2022/0092431 A1   Mar. 24, 2022

(30) Foreign Application Priority Data

Sep. 24, 2020   (KR) .................. 10-2020-0123670

(51) Int. Cl.
  *G01N 21/3504*   (2014.01)
  *G06N 3/088*    (2023.01)
  *G06N 3/045*    (2023.01)

(52) U.S. Cl.
  CPC ......... *G06N 3/088* (2013.01); *G01N 21/3504* (2013.01); *G06N 3/045* (2023.01); *G01N 2201/061* (2013.01); *G01N 2201/129* (2013.01)

(58) Field of Classification Search
  CPC ........ G06N 3/088; G06N 3/0454; G06N 3/08; G01N 21/3504; G01N 2201/061;
  (Continued)

(56) References Cited

U.S. PATENT DOCUMENTS

2019/0302013 A1*   10/2019   Wang ................ G01M 3/38

FOREIGN PATENT DOCUMENTS

KR   10-0947035 B1   3/2010
KR   10-1958541 B1   3/2019
(Continued)

OTHER PUBLICATIONS

Manolakis et al., "Long-wave infrared hyperspectral remote sensing of chemical clouds: a focus on signal processing approaches", IEEE Signal Processing Magazine, vol. 31, No. 4, pp. 120-141. (Year: 2014).*

(Continued)

*Primary Examiner* — Kiho Kim
(74) *Attorney, Agent, or Firm* — Lewis Roca Rothgerber Christie LLP

(57) ABSTRACT

An apparatus for producing an infrared spectrum according to one example of the present disclosure includes: a toxic chemical gas and background infrared spectrum acquisition portion of acquiring a background of a target area and an infrared spectroscopic signal of a gas contaminant plume existing in the background; and a toxic chemical gas infrared spectrum generation portion of training a Generative Adversarial Network (GAN) using acquired background radiation intensity data as learning data, and automatically generating a toxic chemical gas simulation infrared spectrum signal according to an environment setting inputted from a user using a learned GAN. According to the present disclosure, there is an effect that an infrared spectrum of atmosphere contaminated by a toxic chemical gas may be acquired without outdoor experiments using a real toxic chemical gas.

10 Claims, 7 Drawing Sheets

(58) Field of Classification Search
CPC ..... G01N 2201/129; G01N 2021/1795; G01N 2021/3531; G01N 2201/1296; G01N 21/3586; G01N 2021/3595; G01N 2021/4113
See application file for complete search history.

(56) References Cited

FOREIGN PATENT DOCUMENTS

| | | |
|---|---|---|
| KR | 10-2019-0115756 A | 10/2019 |
| KR | 10-2070288 B1 | 1/2020 |
| KR | 10-2082419 B1 | 2/2020 |
| KR | 10-2020-0037816 A | 4/2020 |
| KR | 10-2020-0094656 A | 8/2020 |

OTHER PUBLICATIONS

Korean Notice of Allowance for Application No. 10-2020-0123670 dated Mar. 17, 2021, 6 pages.

* cited by examiner

METHOD AND APPARATUS FOR PRODUCING INFRARED SPECTRUM

CROSS-REFERENCE TO RELATED APPLICATION

The present disclosure claims priority to and the benefit of Korean Patent Application No. 10-2020-0123670, filed on Sep. 24, 2020, the disclosure of which is incorporated herein by reference in its entirety.

BACKGROUND

1. Field of the Invention

The present disclosure relates to a method and an apparatus for producing an infrared spectrum, and more specifically, a method of producing an infrared spectroscopic spectrum of a toxic chemical gas in a Long Wavelength Infrared (LWIR) spectroscopic band using a Generative Adversarial Network (GAN) and an apparatus using the same.

2. Description of Related Art

A toxic chemical gas (Chemical Warfare Agent, CWA) used for a terror such as a nerve agent and a blister agent, and an industrial toxic chemical gas (Toxic Industrial Chemical, TIC) in a chemical industrial complex are colorless and odorless. In case of a leakage accident, a large amount of life damages may be incurred in a short time. In order to minimize damages thereto, an infrared spectroscopic technology based on FTIR (Fourier-Transform InfraRed spectroscopy) is widely used as early detection of a chemical gas and a warning system thereof. A FTIR-based remote sensing technology is the technology of determining whether an atmospheric layer is contaminated or not according to a result of comparing a characteristic of an infrared spectrum (IR spectrum) light-received from various nature backgrounds with a characteristic of a spectrum of the atmospheric layer contaminated by contaminants. A detection principle may be briefly described as follows. An interferometer which is a main component of a FTIR infrared spectroscopic device modulates and detects an infrared signal entered from the atmosphere. A detected interference fringe signal of an analog form is amplified, is filtered, and is converted to a digital signal. Thereafter, a Fast-Fourier-Transform (FFT) process is performed to acquire a radiation intensity spectrum on which characteristics of a background and a contaminant plume are reflected. Here, as a difference between a temperature of a contaminant plume existing in the atmosphere and a temperature in the atmosphere in which the infrared spectroscopic device is positioned is great, identification of the toxic chemical gas becomes easy.

As the above, in order to detect and identify a toxic chemical gas material of the atmosphere, analysis with respect to the spectrum collected by passing through the atmosphere contaminated by the toxic chemical gas reflected from various backgrounds such as forest, sea, sky, and buildings is needed. For the above analysis, in the case of the Czech Republic, an enclosed outdoor gas jet facility is established so as to collect characteristics of a control group spectrum for detecting the toxic chemical gas material. A spectrum characteristic database of the control group can be generated by directly spraying the toxic chemical gas and collecting the infrared spectrum data using the relevant facility. Here, the spectrum characteristic of the atmospheric layer is differently presented depending on an area due to various environmental effects such as a climate feature or a surrounding ecosystem according to an altitude and latitude of the relevant area. Therefore, there is a problem that the spectrum data collected from the Czech Republic, etc. cannot be applied to Korea.

Also, in the case of Korea, a large chamber in which an outdoor safety facility is included is not established. Further, in order to establish the large chamber in which the outdoor safety facility is included, enormous expense is needed. Therefore, in the case of Korea, there is a problem that it is difficult to establish the spectrum characteristic database of the control group, and due to lack of the database, reliability of detecting the toxic chemical gas may be largely lowered.

Also, in a current toxic chemical gas detection system development process, infrared spectrum data is collected and the database is established by spraying a substitute simulated agent such as SF6 and DMMP as a similar agent of the toxic chemical gas used for the terror such as the nerve agent and the blister agent indoors and outdoors. However, the above has a problem of restricting that the infrared spectroscopic characteristic of a real toxic chemical gas is perfectly reflected.

As the related art, KR No. 10-0947035B1 discloses an atmosphere analysis system of a harmful environment using infrared spectroscopy. However, the atmosphere analysis system according to the related art exhausts again the atmosphere of the harmful environment inhaled through an inhalation means. Therefore, there is a defect that a risk of atmospheric pollution still exists, and a worker may be also exposed to the risk.

THE RELATED ART

Patent Document

KR No. 10-0947035B1 (published on Mar. 10, 2010)

SUMMARY OF THE INVENTION

A problem to be solved of the present disclosure is, with respect to the infrared spectroscopic spectrum of a measured toxic chemical gas, to analyze data and make it learn a pattern using a Generative Adversarial Network (GAN) technique, which is an artificial intelligence (AI) technology, and based on a learning result, thereby providing a method of simulatively producing the toxic chemical gas in a given environment according to a requirement of a user and an apparatus using the same.

Meanwhile, the problem to be solved in the present disclosure is not limited as a matter noted in the above. Other problems to be solved which are not noted could be clearly understood by those skilled in the art based on the description below.

An apparatus for producing an infrared spectrum according to one example of the present disclosure to solve the problem as the above may be configured to include: a toxic chemical gas and background infrared spectrum acquisition portion of acquiring a background of a target area and an infrared spectroscopic signal of a gas contaminant plume existing in the background; a toxic chemical gas simulation infrared spectrum generation portion of training a Generative Adversarial Network (GAN) using acquired background radiation intensity data as learning data and automatically generating a toxic chemical gas simulation infrared spectrum signal according to an environment setting inputted from a user using a learned GAN; and a controller of controlling operation of the toxic chemical gas and background infrared spectrum acquisition portion and the toxic chemical gas simulation infrared spectrum generation portion.

Also, the apparatus for producing the infrared spectrum may be configured to further include a background infrared spectrum abstracter guessing a background infrared spectrum inversely using the GAN from a given toxic chemical gas and background infrared spectrum. Also, the apparatus for producing the infrared spectrum may be configured to further include an input portion to which information about at least one toxic chemical gas to be simulated, a gas concentration, a temperature difference of atmospheres in which a contaminant plume and an infrared spectroscopic device are positioned, and atmospheric transmission are input.

Also, the apparatus for producing the infrared spectrum may be configured to further include an output portion outputting an infrared spectrum. Further, the controller may be configured to control the output portion to generate a toxic chemical gas simulation infrared spectrum and combine a generated toxic chemical gas infrared spectrum and an acquired background infrared spectrum, thereby outputting a simulated contaminant plume spectrum as an image form.

Also, the toxic chemical gas simulation infrared spectrum generation portion is configured to make an acquired background and toxic chemical gas radiation intensity spectrum as a target competitively learn a simulated gas and background spectrum generator using the GAN, and an additional classifier is configured to enhance a simulated gas generation effect.

Also, the toxic chemical gas simulation infrared spectrum generation portion is configured to receive acquired background radiation intensity spectrum and toxic chemical gas information, a gas concentration, a temperature difference of atmospheres in which a contaminant plume and an infrared measurement device are positioned, and atmospheric transmission information inputted by the user, and generate a simulated toxic chemical gas using GAN learning result modeling information.

Also, the background infrared spectrum abstracter is configured to receive acquired toxic chemical gas radiation intensity spectrum and toxic chemical gas information, a gas concentration, a temperature difference of atmospheres in which a contaminant plume and an infrared spectrometer are positioned, and atmospheric transmission information from the user, and inversely abstract a previously learned background spectrum from an actual contaminant plume spectroscopic spectrum measured by using the GAN learning result modeling information.

Also, the output portion is configured to: when hyperspectral images are combined, abstract gas concentration information based on a simulated spectrum corresponding to each pixel, determine a color value of each pixel according to a concentration, generate spectrum images, and output an image result as visual information.

Also, the GAN may be configured to include a simulated spectrum generator generating a simulated spectrum that is similar with an actual spectrum; and a simulated spectrum classifier distinguishing the simulated spectrum from the actual spectrum.

Also, the simulated spectrum generator and the simulated spectrum classifier are configured to perform competitive adversarial learning each other using a deep neural network.

Also, the simulated spectrum classifier is configured to: when actual data is input, output a probability value proximate to 1, and when simulated data is input, output a probability value proximate to 0.

Also, the simulated spectrum classifier has a loss function consisting of a sum of when actual data is input, a difference of an output value and 1 and when simulated data is input, a difference of an output value and 0.

A method for producing the infrared spectrum according to one example of the present disclosure may be configured to include steps of: collecting learning data used for training of a model for generating a toxic chemical gas simulation infrared spectrum through acquiring a toxic chemical gas and a background infrared spectrum; training the model using the learning data; generating the toxic chemical gas simulation infrared spectrum using the model; and abstracting the background infrared spectrum from the toxic chemical gas and the background infrared spectrum using the simulated infrared spectrum.

The apparatus for producing the toxic chemical gas infrared spectrum based on the GAN according to one example of the present disclosure includes at least one camera and an infrared sensor, and further includes: a toxic gas and background infrared spectrum acquisition portion of acquiring a background of a target area and an infrared characteristic signal presenting upon leaking of the toxic chemical gas in the background, an input portion to which information about at least one toxic chemical gas to be simulated, atmospheric transmission, a temperature difference of atmospheres in which a gas contaminant plume and a measuring equipment are positioned, and a selected toxic chemical gas absorption coefficient are input by the user, a toxic gas infrared spectrum generation portion of generating a toxic chemical gas infrared simulation spectrum using a previously learned GAN, a background infrared spectrum abstracter of inversely abstracting background information from a really measured toxic chemical gas infrared spectrum, a controller configured to control to generate the infrared simulation spectrum of the chemical gas contaminant plume guessed by applying at least one toxic chemical gas information and atmospheric environment information to the GAN, and an output portion of displaying a result content of simulated infrared spectrum, etc. on a screen.

Also, the toxic chemical gas infrared spectrum generation portion is configured to make a toxic chemical gas infrared spectroscopic spectrum measured in various backgrounds such as a building, a road, forest, and sky learn modeling information previously acquired using the GAN, and then largely generate the infrared spectroscopic simulation spectrum that is similar with the toxic chemical gas information without real measurement according to inputs of the user based on the learned results in a short time.

Also, the background infrared spectrum abstracter is configured to inversely abstract the background spectroscopic spectrum excluding toxic chemical gas information from toxic chemical gas information generated by using a previously learned GAN learning modeling result or a really measured toxic chemical gas infrared spectroscopic spectrum.

Also, the output portion is configured to output simulated infrared spectroscopic spectrum or abstracted background spectrum information as visual information.

Specific matters of other examples are included in "DETAILED DESCRIPTION OF EXEMPLARY EMBODIMENTS" and the attached "DRAWINGS."

Objectives, features and/or advantages of the present disclosure, and a method of achieving the same will be clarified by referring to various examples described specifically hereinafter together with the attached drawings.

However, the following should be understood. The present disclosure is not limited as only configuration of each example to be disclosed hereinafter but may be realized in different and various forms. Each example disclosed in this specification is merely for completing the present disclosure, and is provided for completely inform those skilled in the art of a category of the present disclosure. The present disclosure is defined by only a category of each claim in the scope of claims.

According to the present disclosure, at least one toxic chemical gas infrared spectroscopic simulation spectrum is generated based on a previously measured background and gas information on the basis of AI based learning model. Accordingly, there is an effect of acquiring infrared spectroscopic spectrum characteristics of the atmosphere (contaminant layer or contaminant plume) contaminated by the toxic chemical gas without outdoor experiments using a real toxic chemical gas.

Also, gas contaminant plume information is guessed by analyzing the measured toxic chemical gas infrared spectroscopic spectrum data. Accordingly, there is an effect of inversely abstracting an uncontaminated background infrared spectroscopic spectrum.

DETAILED DESCRIPTION OF EXEMPLARY EMBODIMENTS

Figure 1:
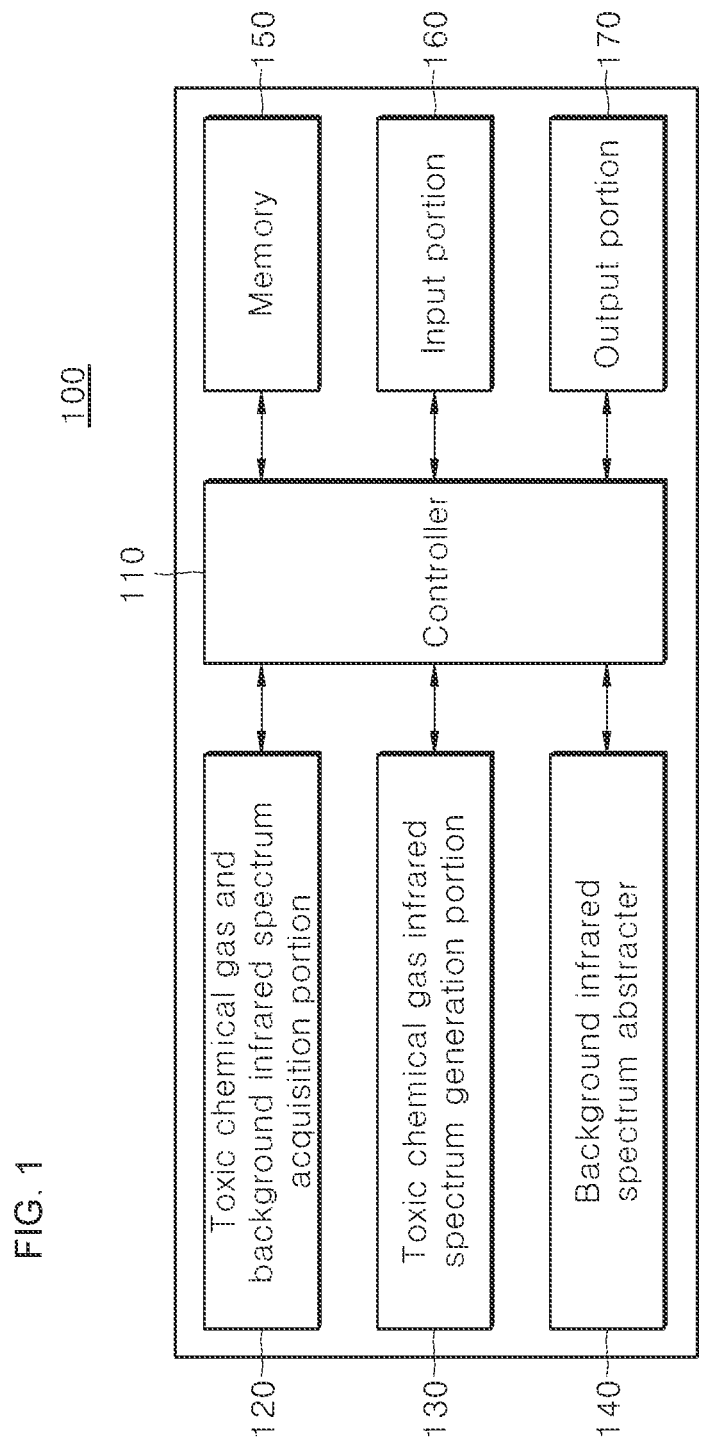
FIG. 1 is a block diagram of an apparatus for producing an infrared spectrum according to one example of the present disclosure.

Hereinafter, referring to the attached drawings, a preferred embodiment according to the present disclosure is explained specifically as follows.

Before describing the preset disclosure specifically, the following should be understood. The terms or words used in this specification should not be construed to be unconditionally limited as a conventional or lexical meaning but an inventor of the present disclosure may properly define and use concepts of various terms to describe his/her invention in the best method. Furthermore, these terms or words should be construed as the meaning and concept corresponding to the technical spirit of the present disclosure.

That is, the following should be understood. The term used in this specification is merely used for describing a preferable example of the present disclosure, and is not used with intent of specifically limiting the content of the present disclosure. These terms are the terms defined under consideration of various possibilities of the present disclosure.

Also, the following should be understood. A singular expression used in this specification may include a plural expression as long as the expression is not definitely differently indicated in the context. Similarly, even if there is the plural expression, the expression may include the singular meaning.

Throughout a whole of this specification, when there is the description that any component "includes" another component, it may mean that any different component is not excluded but the any different component may be further included as long as there is no description particularly opposite to the above.

Furthermore, when there is the description that any component "exists in an inside of another component, or is connected thereto and is installed therein", this component may be directly coupled to another component, be connected thereto and is installed therein, or be spaced apart from the same by a certain distance and installed therein. With respect to the case of being spaced apart from the same by the certain distance and installed therein, the following should be understood. There may be a third component or means for fixing and connecting the relevant component to another component. The description of the third component or means may be omitted.

On the contrary, it should be understood that when there is the description that any component is "directly coupled", or "directly connected" to another component, there is no third component or means.

Identically, other expressions describing a relation of each component, that is, "~between" and "directly ~between", or "neighboring~" and "directly neighboring", etc. should be construed to have the same intent.

Also, if the terms such as "one surface", "another surface", "one side", "another side", "first", and "second" are used in this specification, the following should be understood. The terms are used with respect to one component so as to distinguish this one component from another component, wherein the terms are not used in order that the meaning of the relevant component is limited by the terms as the above.

Also, if the terms related to positions such as "upper", "lower", "left", and "right" are used in this specification, it should be understood that the terms represent relative positions in the relevant drawing with respect to the relevant component. As long as absolute positions with respect to these positions are not specified, the terms related to these positions should not be understood as referring to absolute positions.

Moreover, when the terms "portion", "apparatus", "module", "device" etc. are used in specification of the present disclosure, the terms mean units that may process one or more of function or operation. The above may be realized by hardware or software, or combination of the hardware and the software.

Also, in this specification, when a reference numeral is described with respect to each component of each drawing, an identical component has an identical reference numeral even if this component is presented in other drawings. That is, throughout the whole of specification, identical reference numerals denote identical components.

A size, a position, a combination relation, etc. of each component configuring the present disclosure in the attached drawings of the present disclosure may be described to be partially exaggerated, minimized, or omitted so as to sufficiently and clearly deliver the spirit of the present disclosure or for convenience of the description. Therefore, their proportion or scale may not be precise.

Also, in describing the present disclosure, configuration, for example, the detailed description of known technologies including conventional technologies may be omitted if it is deemed to make the gist of the present disclosure unnecessarily vague.

All terms used herein including technical or scientific terms has the same meaning as the meaning that is generally understood by those skilled in the art as long as they are differently defined.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of the artificial intelligence into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

An ANN is a data processing system modeled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

An ANN may be classified as a single-layer neural network or a multi-layer neural network, based on the number of layers therein.

A general single-layer neural network is composed of an input layer and an output layer.

In addition, a general multi-layer neural network is composed of an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

Meanwhile, a deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An ANN trained using training data can classify or cluster inputted data according to a pattern within the inputted data.

Throughout the present specification, an artificial neural network trained using training data may be referred to as a trained model.

Hereinbelow, learning paradigms of an ANN will be described in detail.

Learning paradigms of an ANN may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

In addition, throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

Meanwhile, the training data may exhibit a number of features, and the training data being labeled with the labels may be interpreted as the features exhibited by the training data being labeled with the labels. In this case, the training data may represent a feature of an input object as a vector.

Using training data and labeling data together, the ANN may derive a correlation function between the training data and the labeling data. Then, through evaluation of the function derived from the ANN, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of ANNs using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, an AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An ANN is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an ANN may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In SGD, a momentum and Nesterov accelerate gradient (NAG) are methods for increasing optimization accuracy by adjusting a step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the ANN is first trained by experimentally setting hyperparameters to various values, and based on the results of training, the hyperparameters can be set to optimal values that provide a stable learning rate and accuracy.

Also, in the description hereinafter, a Long Wave Infrared (LWIR) area related to a spectrum of the toxic chemical gas, for example, an area in which a waveform is 7 to 13 μm is set as an interest area. The case of simulating the spectrum in the interest area is described as an example.

Referring to drawings, a method and an apparatus for producing an infrared spectrum according to one example of the present disclosure, and more specifically, a method and an apparatus for simulatively producing a toxic chemical gas infrared spectrum using a Generative Adversarial Network (GAN) will be described hereinafter.

FIG. 1 is a block diagram of the apparatus for producing the infrared spectrum according to one example of the present disclosure.

Referring to FIG. 1, an apparatus for producing an infrared spectrum 100 may be configured to include a controller 110, a toxic chemical gas and background infrared spectrum acquisition portion 120, a toxic chemical gas infrared spectrum generation portion 130, a background infrared spectrum abstracter 140, a memory 150, an input portion 160, and an output portion 170.

In advance, the toxic chemical gas and background infrared spectrum acquisition portion 120 may acquire an infrared spectrum signal in a LWIR area, for example, an area in which a waveform is 7 to 13 μm. For the above, the apparatus for producing the infrared spectrum 100 may receive a radiation intensity spectrum characteristic signal of a target area acquired through at least one infrared camera.

Here, the target area is various outdoor background information of a mountain, a building, sea, etc. or an atmospheric area in which the toxic chemical gas is sprayed. Various data collected from the target area may be used as learning data of the GAN producing an infrared spectrum of an atmospheric simulated toxic chemical gas according to one example of the present disclosure.

Further, the toxic chemical gas and background infrared spectrum acquisition portion 120 may acquire a hyperspectral imaging datacube consisting of a radiation intensity spectrum or a plurality of radiation intensity spectrums of the atmosphere (background). For the above, the apparatus for producing the infrared spectrum 100 may receive hyperspectral images from a hyperspectral camera.

Further, the toxic chemical gas infrared spectrum generation portion 130 may perform GAN modeling learning in which a background radiation intensity spectrum acquired from the toxic chemical gas and background infrared spectrum acquisition portion 120 is used as learning data. Also, the toxic chemical gas infrared spectrum generation portion 130 may model a contaminant plume contaminated by a specific toxic chemical gas using the GAN trained by learning and may produce a toxic chemical gas simulation infrared spectrum.

Meanwhile, the background infrared spectrum abstracter 140 may inversely abstract a background infrared spectrum using a GAN technique from the background radiation intensity spectrum including the toxic chemical gas acquired from the toxic chemical gas and infrared spectrum acquisition portion 120.

Meanwhile, the memory 150 may store various data and programs for operation of the apparatus for producing the infrared spectrum 100 according to one example of the present disclosure. Also, the memory 150 may store various environment setting information, etc. such as a list of chemical materials which can be simulatively produced, a temperature difference of the atmospheres in which a toxic chemical gas contaminant plume and an infrared spectroscopic device are positioned, and a gas concentration (mg/$m^2$).

The input portion 160 is for receiving the information to be simulated input from a user, and may include a mechanical input means and a touch input means. Meanwhile, a gas to be simulated, that is, information of the toxic chemical gas to be simulated such as a type of the toxic chemical gas and a concentration thereof may be the information stored in the memory 150. In this case, according to input of the user through the input portion 160, at least one toxic chemical gas may be selected, and various information related to a selected toxic chemical gas may be selected.

Further, the apparatus for producing the infrared spectrum 100 according to one example of the present disclosure may output various data through the output portion 170 in accordance with control of the controller 110. For example, the apparatus for producing the infrared spectrum 100 may output a simulated contaminant plume image through the output portion 170 in order that the user visually identifies it. For the above, the output portion 170 may include at least one display portion by which image information may be displayed. Here, a display may be realized as Cathode Ray Tube (CRT), Plasma Display Panel (PDP), Liquid Crystal Display (LCD), Light Emitting Diode (LED), Organic Light Emitting Diode (OLED), etc. but is not limited thereto.

Meanwhile, the controller 110 controls overall operation of the apparatus for producing the infrared spectrum 100 according to one example of the present disclosure. For example, the controller 110 may control operation and operation sequences of each connected component, and may control the each connected component based on information inputted through the input portion 160.

For examples, the controller 110 may receive at least one selected by the user in a toxic chemical gas list through the input portion 160. Also, it is possible to receive any concentration of a chemical agent to be simulated, a temperature difference, and background information input by the user. Based on the input information, it is possible to produce a toxic chemical gas simulation spectrum according to GAN modeling.

Figure 2:
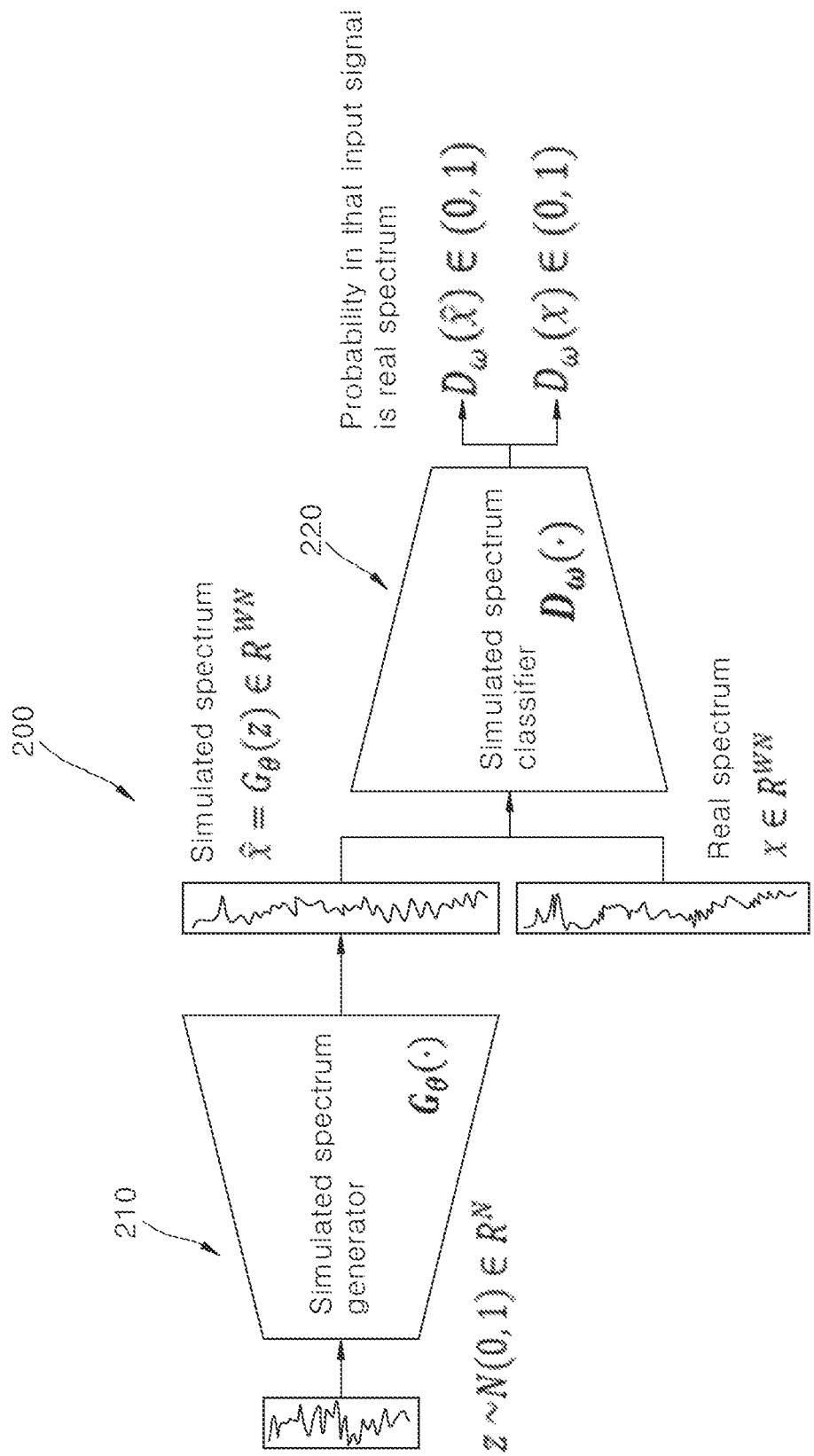
FIG. 2 is a schematic view for describing a Generative Adversarial Network (GAN) to produce a toxic chemical gas simulation infrared spectrum according to one example of the present disclosure.

FIG. 2 is a schematic view for describing a Generative Adversarial Network (GAN) to produce a toxic chemical gas simulation infrared spectrum according to one example of the present disclosure.

The toxic chemical gas infrared spectrum generation portion 130 may produce a toxic chemical gas simulation infrared spectrum using a Generative Adversarial Network (GAN) 200.

Further, the GAN 200 may produce the toxic chemical gas simulation infrared spectrum through training in which a background collected by the toxic chemical gas and background infrared spectrum acquisition portion 120 or infrared radiation intensity spectrum information of the toxic chemical gas is used as learning data.

The GAN 200 may be configured to include a simulated spectrum generator 210 that generates a simulated spectrum from a noise signal and a simulated spectrum classifier 220 that determines whether to be true or false with respect to a generated simulated spectrum. Here, a noise signal (z) simply uses a value randomly extracted from a uniform distribution or a normal distribution.

$$z \sim N(0,1) \in R^N \quad \text{[Equation 1]}$$

The simulated spectrum generator 210 receives a signal of a random vector (z) consisting of a predetermined $N^{th}$ random noise and generates a simulated spectrum ($\hat{x}$).

$$\hat{x} = G_\theta(z) \in R^{WN} \quad \text{[Equation 2]}$$

In equation 2, the user may directly designate any number (real number) according to resolution performance of an infrared spectroscopic device to be simulated as wavenumber information of the spectrum.

With respect to an acquired simulated spectrum ($\hat{x}$) and a real spectrum ($\hat{x}$) as a target, the simulated spectrum classifier 220 determines whether the input signal is a real spectrum or not by probability. Here, when determining as a real spectrum, the number proximate to 1 is output, and when determining as the simulated spectrum, the number proximate to 0 is output. The above may be expressed as an equation as below.

$$D_\omega(\hat{x}) \in (0,1)$$

$$D_\omega(x) \in (0,1) \quad \text{[Equation 3]}$$

The GAN 200 makes the simulated spectrum generator 210 and the simulated spectrum classifier 220 competitively learn at the same time. Accordingly, a learning target of the simulated spectrum generator 210 is to generate a simulated spectrum that is similar with real one and to fake the simulated spectrum classifier 220. On the contrary, the learning target of the simulated spectrum classifier 220 is to exactly distinguish simulated data made by the simulated spectrum generator 210 from real data. For competitive adversarial learning as the above, both of them are learned using a deep neural network that is an artificial neural network at the same time. Here, a loss function to be minimized in a learning process is as follows.

$$\mathcal{L} = \max_\theta \min_\omega -[\log D_\omega(x) + \log(1 - D_\omega(G_\theta(z)))] \quad \text{[Equation 4]}$$

Interpreting and describing the above, the simulated spectrum classifier 220 should output a probability value proximate to 1 when real data is input, and it should output a probability value proximate to 0 when simulated data is input. The loss function is formed of a sum of both of them. That is, the above is the sum of a difference between an output value when real data is input and 1 and a difference between an output value when simulated data is input and 0. Upon learning, a parameter of the simulated spectrum classifier 220 is updated in a direction of minimizing a value of the loss function. On the contrary, an objective of the simulated spectrum generator 210 fakes the classifier 220. Again, when the simulated spectrum made by the generator 210 is input to the classifier 220, an output value should be the value proximate to 1. A degree in which the value is away from 1 is the loss function, and the generator 210 is learned to minimize the above.

Figure 3:
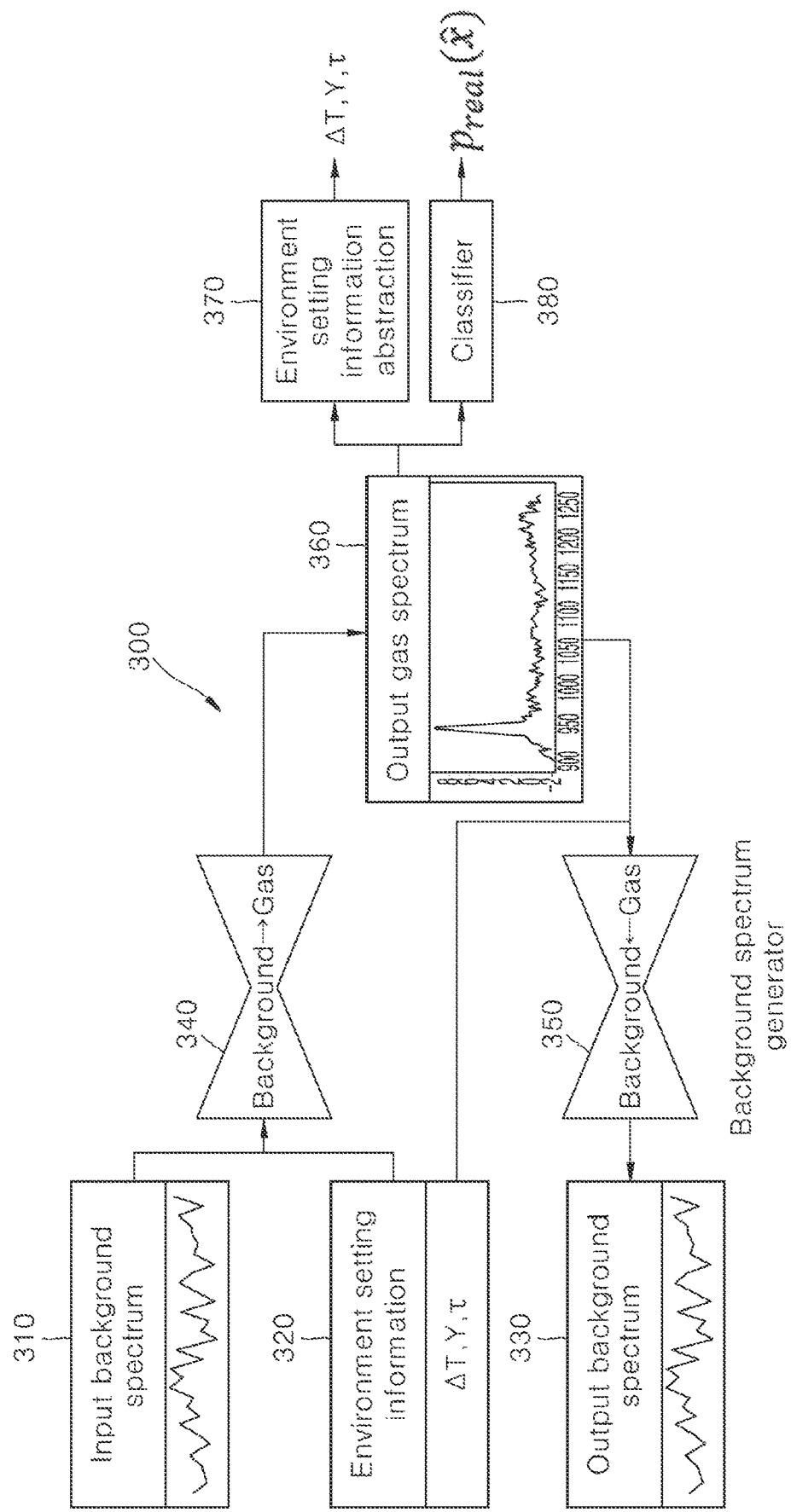
FIG. 3 is a block diagram for describing a learning structure of a Generative Adversarial Network (GAN) to produce a toxic chemical gas simulation infrared spectrum according to one example of the present disclosure.

FIG. 3 is a block diagram for describing a learning structure of a Generative Adversarial Network (GAN) to produce a toxic chemical gas simulation infrared spectrum according to one example of the present disclosure.

Compared to a basic simulated spectrum generation technique of FIG. 2, it is configured as two generators for high learning effects, so that there is a difference. It is divided as a gas spectrum generator 340 and a background spectrum generator 350. Here, the gas spectrum generator 340 includes environment setting information input from the user in a given background information (information that does not include toxic chemical gas information) and generates simulated spectrum information close to real one. The background spectrum generator 350 predicts environment setting information from a simulated spectrum generated as the above and abstracts a background spectrum that does not include toxic chemical gas.

In advance, the loss function for learning of the gas spectrum generator 340 is as a follow equation.

$$\mathcal{L}_{BG \to GAS} = \max_\theta \min_\omega -[\log D_\omega^{GAS}(x_{GAS}) + \quad \text{[Equation 5]}$$
$$\log(1 - D_\omega^{GAS}(G_\theta^{BG \to GAS}(x_{BG}, \Phi)))] +$$

-continued $$\min_\theta \|x_{BG} - G_\phi^{GAS \to BG}(G_\theta^{BG \to GAS}(x_{BG}, \Phi), \Phi)\|^2 +$$

$$\|x_{GAS} - G_\theta^{BG \to GAS}(G_\phi^{BAS \to BG}(x_{GAS}, \Phi), \Phi)\|^2$$

Also, the loss function for learning of the background spectrum generator 350 is expressed as a follow equation.

$$\mathcal{L}_{BG \to GAS} = \max_\phi \min_\delta -[\log D_\delta^{BG}(x_{BG}) + \qquad [\text{Equation 6}]$$

$$\log(1 - D_\delta^{BG}(G_\phi^{GAS \to BG}(x_{GAS}, \Phi)))] +$$

$$\min_\phi \|x_{BG} - G_\phi^{GAS \to BG}(G_\theta^{BG \to GAS}(x_{BG}, \Phi), \Phi)\|^2 +$$

$$\|x_{GAS} - G_\theta^{BG \to GAS}(G_\phi^{BAS \to BG}(x_{GAS}, \Phi), \Phi)\|^2$$

Here, $x_{BG}$ and $x_{GAS}$ represent a background and toxic chemical gas spectrum. In an input variable set $\Phi = \{\Delta T, \tau, \gamma\}$, $\Delta T$ a temperature difference in the atmosphere in which a contaminant plume and an infrared measurement device are positioned, $\tau$ is atmospheric transmission, and $\gamma$ represents a concentration (mg/m$^2$) of the toxic chemical gas. $G_\phi^{GAS \to BG}$ and $G_\theta^{BG \to GAS}$ represent a generation function that abstracts background information from the toxic chemical gas spectrum and a function that generates toxic chemical gas information from background information. $D_\delta^{BG}(x_{BG})$ is a probability in that when background data is input, the classifier determines it as a background signal. On the contrary, when gas data is input, a probability in that it is determined as a gas is expressed as $D_\omega^{GAS}(x_{GAS})$. Accordingly, a whole loss function of a system to be minimized in an optimizing process upon learning is as follows.

$$\mathcal{L} = \mathcal{L}_{BG \to GAS} + \mathcal{L}_{GAS \to BG} \qquad [\text{Equation 7}]$$

Meanwhile, the controller 110 may specify environment setting information such as the toxic chemical gas information that is used in a simulated gas spectrum generation process of FIG. 3 and atmospheric transmission.

For example, the controller 110 may receive at least one of a plurality of the toxic chemical gas information stored as a form of a library in the memory 150 selected by the user through the input portion 160. Further, the controller 110 may also receive a concentration ($\gamma$) of each of at least one toxic chemical gas selected by the user from the input portion 160. Also, the controller 110 may also receive a temperature difference ($\Delta T$) of atmospheres in which a contaminant plume and a spectroscopic device that is target equipment to be simulated are positioned, atmospheric transmission ($\tau$), and background radiation intensity spectrum information selected by the user from the input portion 160.

Meanwhile, the toxic chemical gas simulation spectrum to be generated may be generated per each pixel configuring an image.

Figure 4:
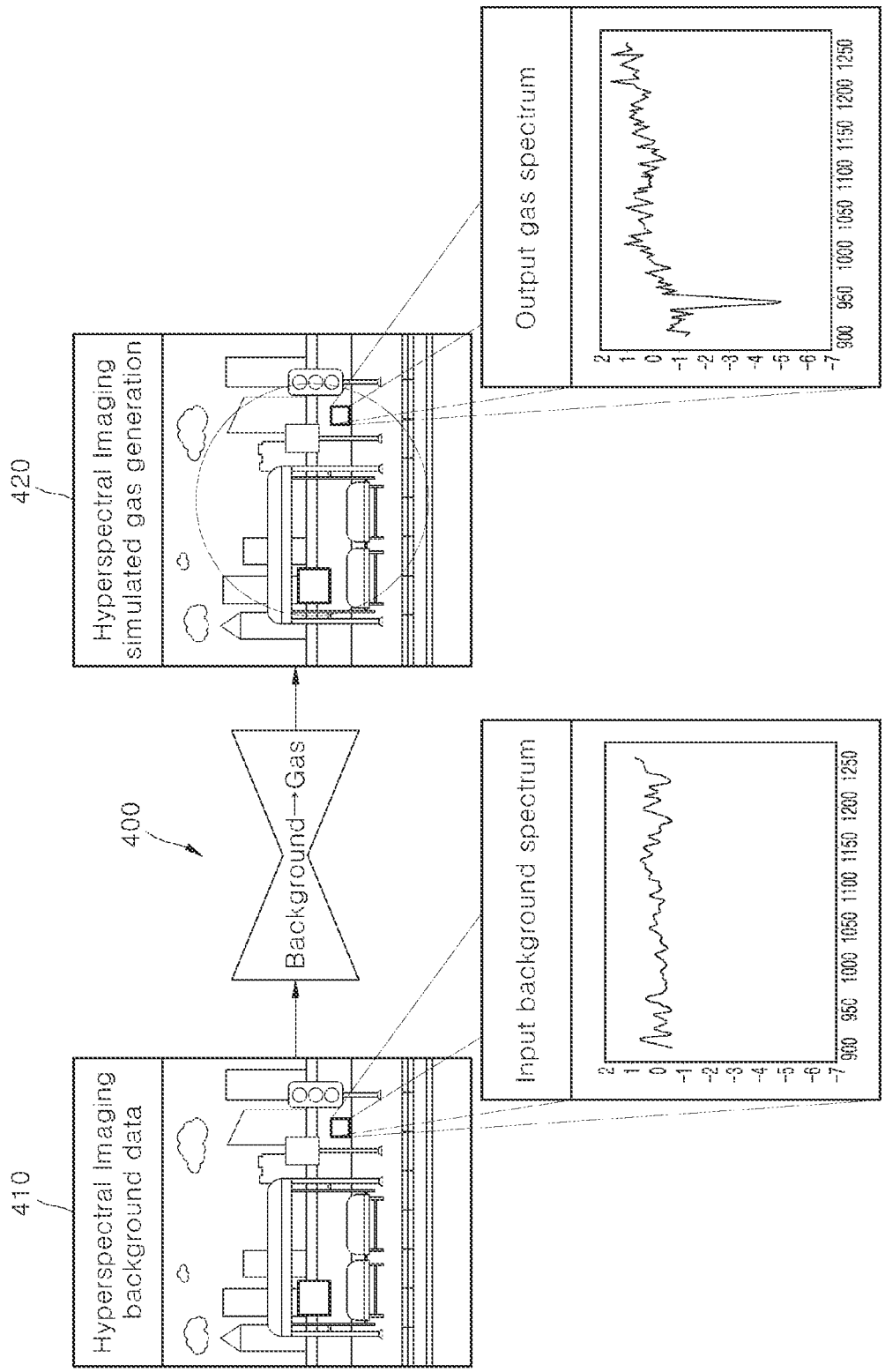
FIG. 4 is an example view of using an apparatus for producing an infrared spectrum according to one example of the present disclosure.

FIG. 4 is an example view of using an apparatus for producing an infrared spectrum according to one example of the present disclosure.

Referring to FIG. 4, the controller 110 may control the output portion 170 to imagine a simulated spectrum per each pixel that is generated. The controller 110 may combine spectrum images generated as the above and background images and may generate a simulated contaminant plume image.

In this case, the simulated contaminant plume image may be differently represented such that an area contaminated by the toxic chemical gas is differentiated from an area that is not contaminated in the background image. Even in areas where are contaminated by the same toxic chemical gas, if a concentration is different, the areas may differently represented each other. Accordingly, a state of the atmosphere contaminated by the simulated contaminant plume may be visually represented through the simulated contaminant plume image.

Figure 5:
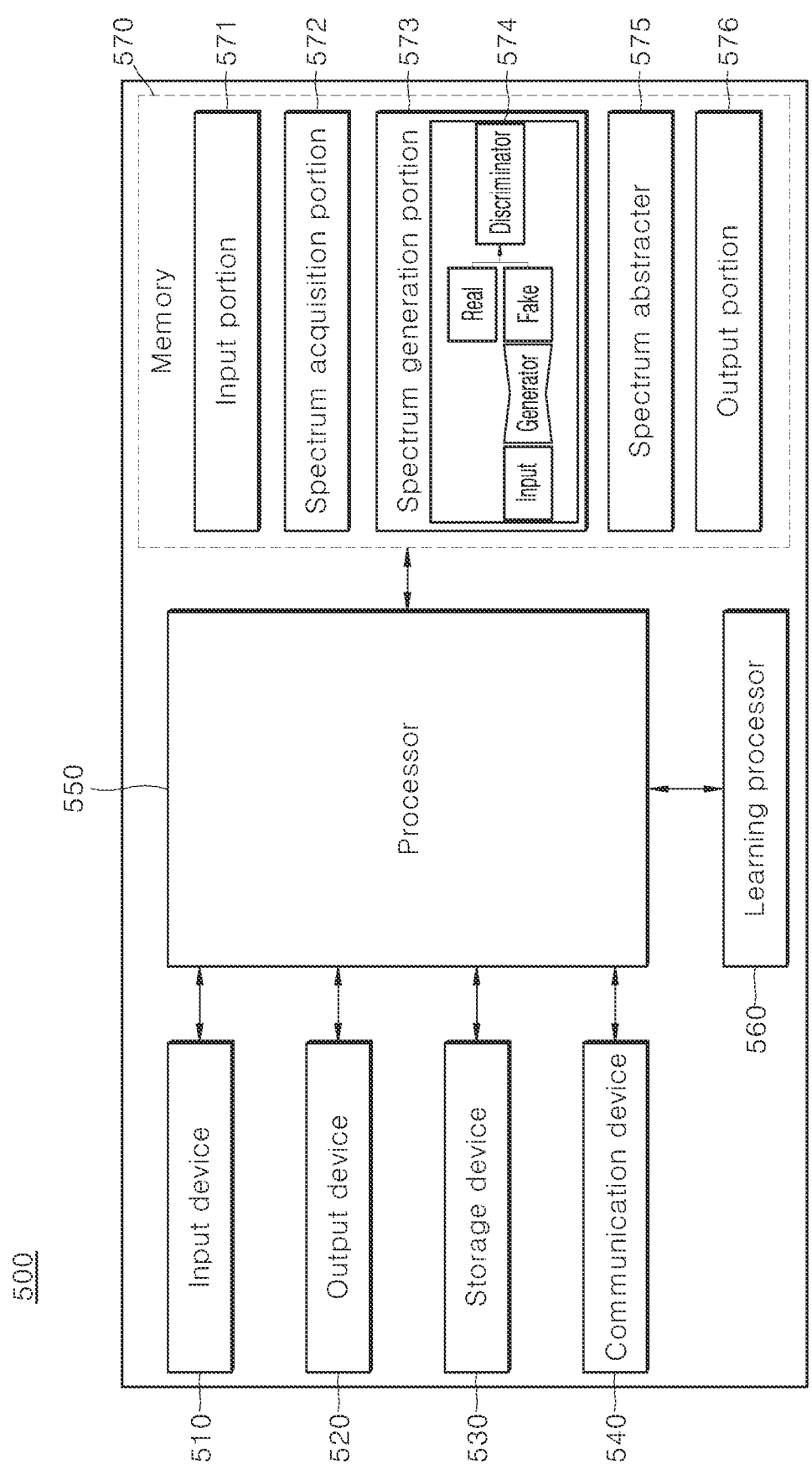
FIG. 5 is a block diagram of an apparatus for producing an infrared spectrum according to one example of the present disclosure.

FIG. 5 is a block diagram of an apparatus for producing an infrared spectrum according to one example of the present disclosure.

Referring to FIG. 5, the block diagram of the apparatus for producing the infrared spectrum according to one example of the present disclosure is shown, wherein the apparatus is realized by using a computer corresponding to a computing device, for example, hardware, and a program module corresponding to software.

An input device 510 is a component corresponding to the input portion 160 of FIG. 1. An output device 520 is a component corresponding to the output portion 170 of FIG. 1.

A storage device 530 is a component corresponding to the memory 150 of FIG. 1.

A communication device 540 may include devices of a local area communication module, a wireless communication module, a data communication module, an interne communication module, for example, a bluetooth module, a wireless lan module such as Wi-Fi, a wired lan module such as an ethernet card, modem, etc.

Also, an apparatus for producing an infrared spectrum 500 may receive an infrared spectrum characteristic signal from a camera, for example, an infrared camera and an infrared spectroscopic device through the communication device 540.

A processor 550 may execute a program mounted on a memory including an instruction set for implementing the method for producing the infrared spectrum according to one example of the present disclosure.

A learning processor 560 is a device for training the GAN according to one example of the present disclosure through learning. There is a feature that it is configured in a form of a Graphic Processing Unit (GPU), and thus it is properly designed to perform operations by an Artificial Neural Network (ANN).

A memory 570 is a device on which a program module that executes a process configuring a method (S100) for producing an infrared spectrum according to one example of the present disclosure is mounted.

An input portion 571 corresponds to a device that processes the spectrum characteristic signal from the input device 510, for example, an infrared camera and an infrared spectrometer.

A spectrum acquisition portion 572 is a component corresponding to the toxic chemical gas and background infrared spectrum acquisition portion 120.

A spectrum generation portion 573 is a component corresponding to the toxic chemical gas infrared spectrum generation portion 130 of FIG. 1.

A Generative Adversarial Network (GAN) 574 corresponds to one type of ANN that generates a toxic chemical gas simulation infrared spectrum through learning.

A spectrum abstracter 575 is a component corresponding to the background infrared spectrum abstracter 140 of FIG. 1.

An output portion 576 corresponds to a device processing an output signal transmitted to the output device 520, for example, a monitor.

Figure 6:
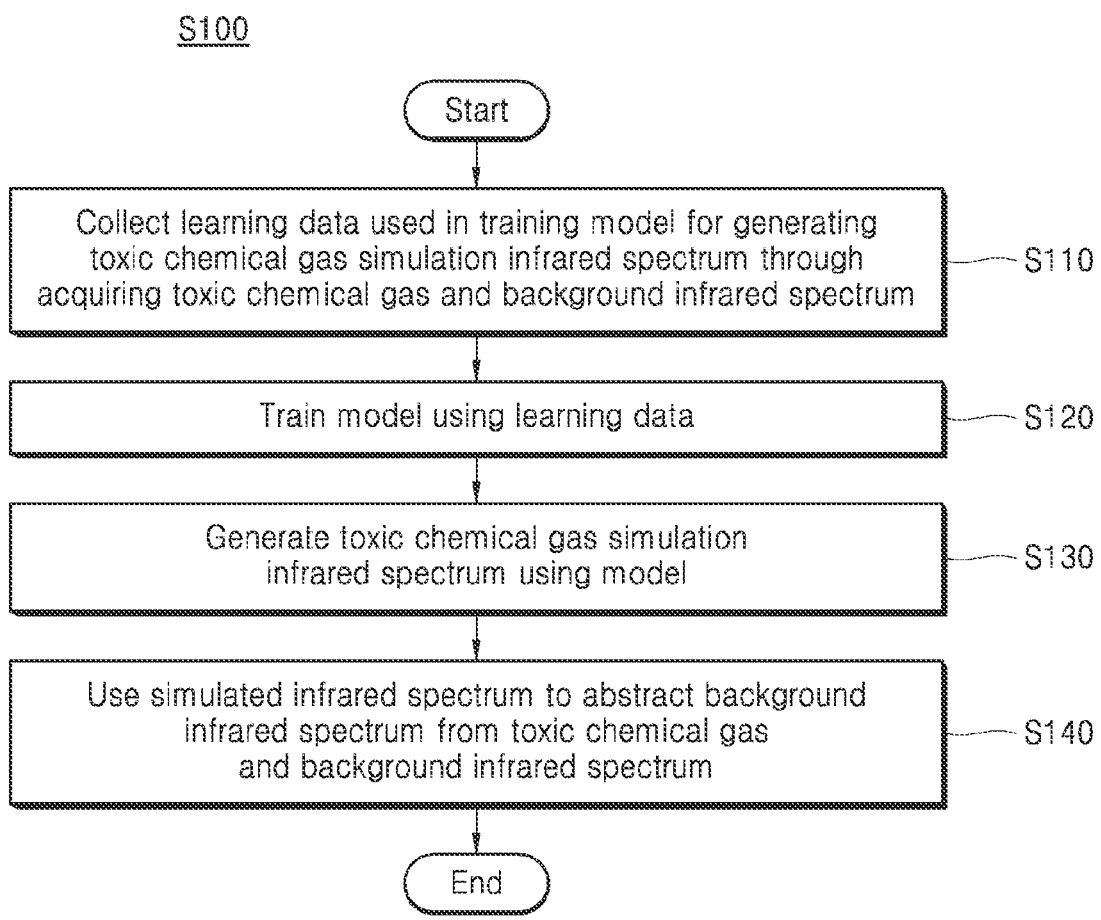
FIG. 6 is a flowchart of a method for producing an infrared spectrum according to one example of the present disclosure.

FIG. 6 is a flowchart of a method for producing an infrared spectrum according to one example of the present disclosure.

Referring to FIG. 6, the method for producing the infrared spectrum (S100) may be configured to include learning data collection (S110), model training (S120), simulated infrared spectrum generation (S130), and background infrared spectrum abstraction (S140).

In S110, the apparatus for producing the infrared spectrum 100 may collect learning data used in training of a model for generating a toxic chemical gas simulation infrared spectrum through acquiring a toxic chemical gas and a background infrared spectrum.

In S120, the apparatus for producing the infrared spectrum 100 may train the model, for example, GAN using learning data.

In S130, the apparatus for producing the infrared spectrum 100 may use the model to generate a toxic chemical gas simulation infrared spectrum.

In S140, the apparatus for producing the infrared spectrum 100 may use a simulated infrared spectrum to abstract a background infrared spectrum from the toxic chemical gas and the background infrared spectrum.

Figure 7:
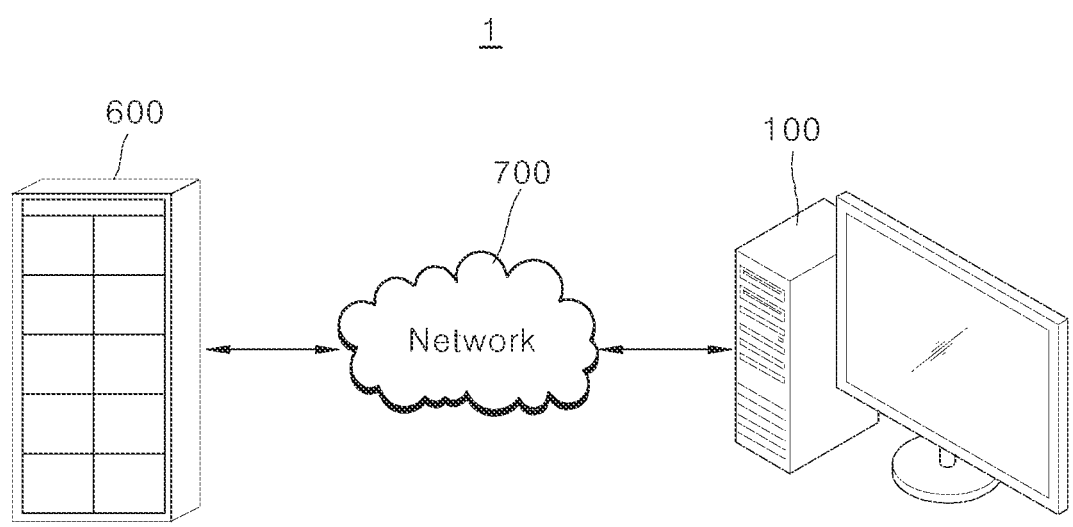
FIG. 7 is an example view of a network to which an apparatus for producing an infrared spectrum and a server according to one example of the present disclosure are connected.

FIG. 7 is an example view of a network to which an apparatus for producing an infrared spectrum and a server according to one example of the present disclosure are connected.

Referring to FIG. 7, the apparatus for producing the infrared spectrum 100 according to one example of the present disclosure may be communicatively connected to a server 600 through a network 700.

The apparatus for producing the infrared spectrum 100 may receive various spectrum characteristic signals transmitted by the input device 510, for example, an infrared camera and an infrared spectroscopic device through the network 700.

The server 600 corresponding to hardware may be configured to include various software servers, for example, a cloud server, a web server, a database server, an artificial intelligence API server, and a data mining server. Further, the apparatus for producing the infrared spectrum 100 may receive various server functions through communication with the server 600.

The network 700 may be any proper communication network including wired and wireless networks, for example, a local area network (LAN), a wide area network (WAN), an internet, and an intranet and an extranet, and a mobile network, for example, a cellular network, a 3G network, a LTE network, a WiFi network, and an adhoc network, and combinations thereof.

The network 700 may include connection of network elements such as a hub, a bridge, a router, a switch, and a gateway. The network 700 may include one or more of connected networks, for example, a multiple network environment, including a public network such as an internet and a private network such as a corporate private network, which is safe. Access to the network 700 may be provided through one or more of wired or wireless access networks.

Meanwhile, in the description of the present disclosure as the above, specific examples are explained but various modifications may be embodied without deviating from a range of the present disclosure. For example, according to the present disclosure, a plurality of toxic chemical gases, for example, a simulated spectroscopic signal with respect to the contaminant plume including a multiple agent, other than one chemical gas may be surely generated.

The present disclosure as previously described may be configured as a code which can be read by a computer in a medium in which a program is recorded. A computer readable medium includes all kinds of recording devices in which data that can be read by a computer system is stored. Examples of the computer readable medium includes are Hard Disk Drive (HDD), Solid State Disk (SSD), Silicon Disk Drive (SDD), ROM, RAM, CD-ROM, a magnetic tape, a floppy disk, an optical data storage device, etc. and, it may be configured in a form of a carrier wave (for examples, transmission through the internet). Also, the computer may include the controller 110.

Meanwhile, the disclosure may be changed and modified by one having ordinary skill in the art to which the disclosure pertains in various different forms within the scope of the technical spirit of the disclosure. The above detailed description should not be limitedly interpreted in all aspects but should be considered as examples. The scope of the present disclosure is defined by rational interpretation of the appended claims. Further, all the modifications within the equivalent range of the present disclosure should be interpreted as being included in the scope of the present disclosure.

According to one example of the present disclosure as the above, at least one toxic chemical infrared spectroscopic simulated spectrum is generated based on a previously measured background and gas information on the basis of an AI based learning model. Accordingly, there is the effect that the infrared spectroscopic characteristic of the atmosphere (contaminant layer or contaminant plume) contaminated by the toxic chemical gas may be acquired without outdoor experiments using a real toxic chemical gas.

Also, gas contaminant plume information is guessed by analyzing the measured toxic chemical gas infrared spectroscopic spectrum data. Accordingly, there is the effect of inversely abstracting an uncontaminated background infrared spectroscopic spectrum.

As the above, preferable various embodiments of the present disclosure are described with some examples. However, it could be understood that the description about various embodiments described in the item "DETAILED DESCRIPTION OF EXEMPLARY EMBODIMENTS" is merely provided as examples. Those skilled in the art may variously modify and implement the present disclosure based on the description as the above, or may perform the equivalents thereof.

Also, the following should be understood. The present disclosure is not limited by the detailed description since the present disclosure may be realized in different and various forms. The description as the above is to complete the disclosed content of the present disclosure, and is merely provided to completely inform those skilled in the art of a category of the present disclosure. The present disclosure is defined by only each claim in the scope of claims.

What is claimed is:

1. An apparatus for producing an infrared spectrum comprising:
a toxic chemical gas and background infrared spectrum acquisition portion for acquiring a background of a target area and an infrared spectroscopic signal of a gas contaminant plume existing in the background;
a toxic chemical gas simulation infrared spectrum generation portion for training a Generative Adversarial Network (GAN) using acquired background radiation intensity data as learning data and automatically generating a toxic chemical gas simulation infrared spectrum signal according to an environment setting inputted from a user using a learned GAN; and
a controller for controlling operation of the toxic chemical gas and background infrared spectrum acquisition portion and the toxic chemical gas simulation infrared spectrum generation portion,
wherein the apparatus for producing the infrared spectrum further comprises:
a background infrared spectrum abstracter for guessing the background infrared spectrum inversely using the GAN from a given toxic chemical gas and the background infrared spectrum;
an input portion to which at least one toxic chemical gas information to be simulated, a gas concentration, a temperature difference of atmospheres in which a contaminant plume and an infrared spectroscopic device are positioned, and atmospheric transmission are input; and
an output portion for outputting the infrared spectrum, wherein the controller is configured to control the output portion to generate a toxic chemical gas simulation infrared spectrum, and combine a generated toxic chemical gas infrared spectrum and an acquired background infrared spectrum, thereby outputting a simulated contaminant plume spectrum as an image form; and
wherein the toxic chemical gas simulation infrared spectrum generation portion is configured to: make an acquired background and toxic chemical gas radiation intensity spectrum as a target competitively learn a simulated gas and background spectrum generator using the GAN, wherein an additional classifier is configured to enhance a simulated gas generation effect.

2. The apparatus for producing the infrared spectrum of claim 1, wherein
the toxic chemical gas simulation infrared spectrum generation portion is configured to:
receive acquired background radiation intensity spectrum and toxic chemical gas information, a gas concentration, a temperature difference of atmospheres in which a contaminant plume and an infrared measurement device are positioned, and atmospheric transmission information inputted by the user, and
generate a simulated toxic chemical gas infrared spectrum using GAN learning result modeling information.

3. The apparatus for producing the infrared spectrum of claim 1, wherein
the background infrared spectrum abstracter is configured to:
receive acquired toxic chemical gas radiation intensity spectrum and toxic chemical gas information, a gas concentration, a temperature difference of atmospheres in which a contaminant plume and an infrared measurement device are positioned, and atmospheric transmission information inputted from the user, and
abstract a previously learned background spectrum inversely from an actual contaminant plume spectroscopic spectrum measured by using GAN learning result modeling information.

4. The apparatus for producing the infrared spectrum of claim 1, wherein
the output portion is configured to:
when hyperspectral images are combined, abstract gas concentration information based on a simulated spectrum corresponding to each pixel, determine a color value per each pixel according to a concentration, generate spectrum images, and output an image result as visual information.

5. The apparatus for producing the infrared spectrum of claim 1, wherein
the GAN includes:
a simulated spectrum generator of generating a simulated spectrum that is similar with an actual spectrum; and
a simulated spectrum classifier of distinguishing the simulated spectrum from the actual spectrum.

6. The apparatus for producing the infrared spectrum of claim 5, wherein
the simulated spectrum generator and the simulated spectrum classifier are configured to perform competitive adversarial learning each other using a deep neural network.

7. The apparatus for producing the infrared spectrum of claim 5, wherein
the simulated spectrum classifier is configured to:
when actual data is input, output a probability value proximate to 1, and
when simulated data is input, output a probability value proximate to 0.

8. The apparatus for producing the infrared spectrum of claim 5, wherein
the simulated spectrum classifier has a loss function consisting of a sum of:
when actual data is input, a difference of an output value and 1; and
when simulated data is input, a difference of an output value and 0.

9. A method for producing an infrared spectrum comprising steps of:
receiving at least one toxic chemical gas information to be simulated, a gas concentration, a temperature difference of atmospheres in which a contaminant plume and an infrared spectroscopic device are positioned, and atmospheric transmission;
acquiring, via a toxic chemical gas and background infrared spectrum acquisition portion, a background of a target area and an infrared spectroscopic signal of a gas contaminant plume existing in the background;
training, via a toxic chemical gas simulation infrared spectrum generation portion, a Generative Adversarial Network (GAN) using acquired background radiation intensity data as learning data and automatically generating a toxic chemical gas simulation infrared spectrum signal according to an environment setting inputted from a user using a learned GAN, wherein the training includes making an acquired background and toxic chemical gas radiation intensity spectrum as a target competitively learn a simulated gas and background spectrum generator using the GAN, wherein an additional classifier is configured to enhance a simulated gas generation effect;
controlling, via a controller, operation of the toxic chemical gas and background infrared spectrum acquisition portion and the toxic chemical gas simulation infrared spectrum generation portion;
guessing, via a background infrared spectrum abstracter, the background infrared spectrum inversely using the GAN from a given toxic chemical gas and the background infrared spectrum; and
outputting, via an output portion, the infrared spectrum, wherein the outputting includes generating a toxic chemical gas simulation infrared spectrum, and combining a generated toxic chemical gas infrared spectrum and an acquired background infrared spectrum, thereby outputting a simulated contaminant plume spectrum as an image form.

10. An apparatus for producing an infrared spectrum comprising:
- an input for receiving at least one toxic chemical gas information to be simulated, a gas concentration, a temperature difference of atmospheres in which a contaminant plume and an infrared spectroscopic device are positioned, and an atmospheric transmission;
- a processor; and
- a memory, wherein the memory stores instructions that, when executed by the processor, cause the processor to:
  - acquire a background of a target area and an infrared spectroscopic signal of a gas contaminant plume existing in the background; and
  - train a Generative Adversarial Network (GAN) using acquired background radiation intensity data as learning data and automatically generate a toxic chemical gas simulation infrared spectrum signal according to an environment setting inputted from a user using a learned GAN.

* * * * *

UNITED STATES PATENT AND TRADEMARK OFFICE
CERTIFICATE OF CORRECTION

PATENT NO. : 11,610,133 B2  
APPLICATION NO. : 17/124323  
DATED : March 21, 2023  
INVENTOR(S) : Hyunwoo Nam et al.

Page 1 of 1

It is certified that error appears in the above-identified patent and that said Letters Patent is hereby corrected as shown below:

On the Title Page

Item (72) Delete:
"Chang Sik Lee, Daejeon (KR);
Jong Seon Kim, Daejeon (KR);
Hyeon Jeong Kim, Daejeon (KR)"

Insert:
--Hyunwoo Nam, Daejeon (KR);
Chang Sik Lee, Daejeon (KR);
Jong Seon Kim, Daejeon (KR);
Hyeon Jeong Kim, Daejeon (KR)--

Signed and Sealed this  
Nineteenth Day of November, 2024

Katherine Kelly Vidal  
*Director of the United States Patent and Trademark Office*